March 29, 1966  E. M. FISCHEL  3,242,744
SATELLITE VERTICAL REFERENCE SYSTEM
Filed Feb. 26, 1962  3 Sheets-Sheet 1

EDUARD M. FISCHEL
INVENTOR.

BY S. A. Giarratana
George B. Oujevolk
ATTORNEYS

March 29, 1966  E. M. FISCHEL  3,242,744
SATELLITE VERTICAL REFERENCE SYSTEM
Filed Feb. 26, 1962  3 Sheets-Sheet 2

EDUARD M. FISCHEL
INVENTOR.

March 29, 1966  E. M. FISCHEL  3,242,744
SATELLITE VERTICAL REFERENCE SYSTEM
Filed Feb. 26, 1962  3 Sheets-Sheet 3

EDUARD M. FISCHEL
INVENTOR.

BY S. A. Giarratana
George B. Oujevolk
ATTORNEYS

United States Patent Office 3,242,744
Patented Mar. 29, 1966

3,242,744
SATELLITE VERTICAL REFERENCE SYSTEM
Eduard M. Fischel, Wayne, N.J., assignor to General Precision Inc., Little Falls, N.J., a corporation of Delaware
Filed Feb. 26, 1962, Ser. No. 175,591
3 Claims. (Cl. 74—5.34)

The present invention relates to gyro compassing aboard a space satellite orbiting the earth, and more particularly to an arrangement for providing a vertical 3 axes reference to a space satellite.

The center of a satellite navigational system is a platform having thereon a plurality of gyros. These and other instruments establish the platform attitude in space. The platform is gimbaled, and, with proper initial alignment and subsequent monitoring provides a constant reference, regardless of the motion of the satellite. In an aircraft, the vertical reference is usually provided by a pendulum system. The pendulum systems used in aircraft are highly accurate to seconds of arc. Since a pendulous system is useless in space, the vertical reference is normally provided by a horizon tracker, either mounted on the platform or supplying information to the platform if mounted elsewhere on the space vehicle. This is "a device for establishing the vertical by precisely tracking the visible horizon simultaneously in mutually orthogonal directions." (C. W. Besserer et al. "Guide to the Space Age," Prentiss Hall, Inc., 1959, page 125.) The accuracy of the horizon tracker however leaves much to be desired, and, at best is accurate only to about one-quarter degree. This is sufficient to throw off the platform instrumentation to a degree that highly accurate navigation of the space vehicle is impossible. Although many attempts have been made to provide a good vertical reference to an orbiting space vehicle, none, as far as I am aware was ever successful when carried out into practice.

It has now been discovered that it is possible to greatly improve the platform vertical reference information derived from the horizon tracker.

Thus, an object of the present invention is to provide a space vehicle vertical reference system providing highly accurate information to the vehicle platform.

A further object of the present invention is to provide a space vehicle vertical reference system without placing a heavy instrumentation burden on the platform and in line with presently used instruments and techniques.

With the foregoing and other objects in view, the invention resides in the novel arrangement and combination of components and in the details of construction hereinafter described, it being understood that changes in the precise embodiment of the invention herein disclosed may be made within the scope of what is described without departing from the spirit of the invention. The advantages of the invention will become apparent from the following description taken in conjunction with the accompanying drawings, in which.

Figure 7:
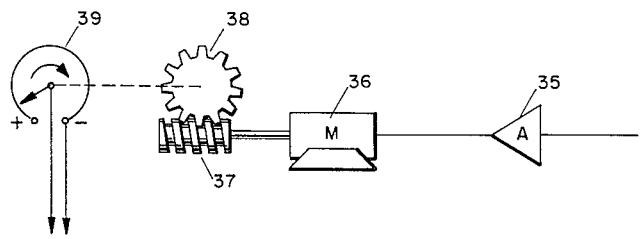
Figure 2:
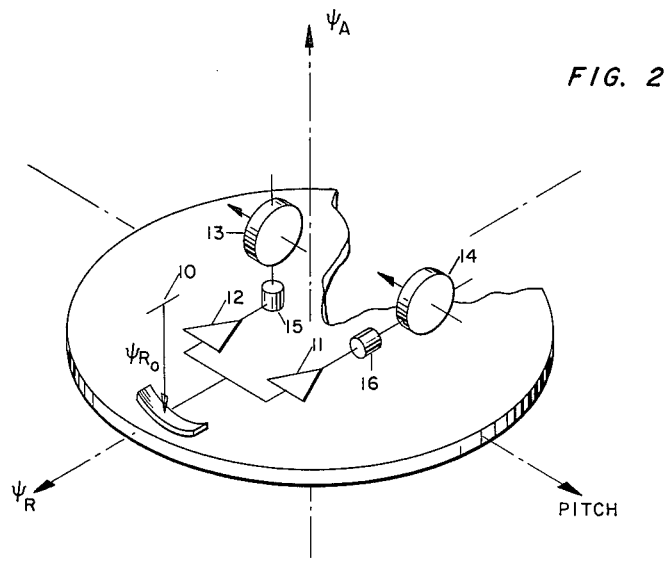
FIGURE 2 shows the components illustrated in FIGURE 1 likewise in a partially perspective and partially schematic view, but in a more understandable form.
Figure 3:
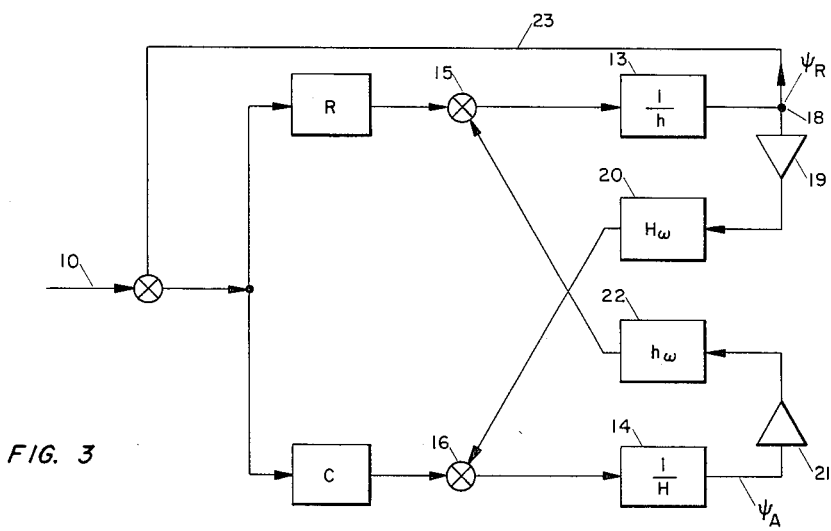
Figure 6:
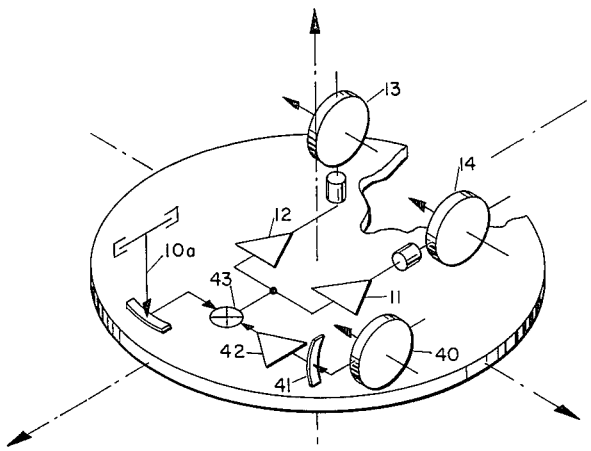
Figure 4:
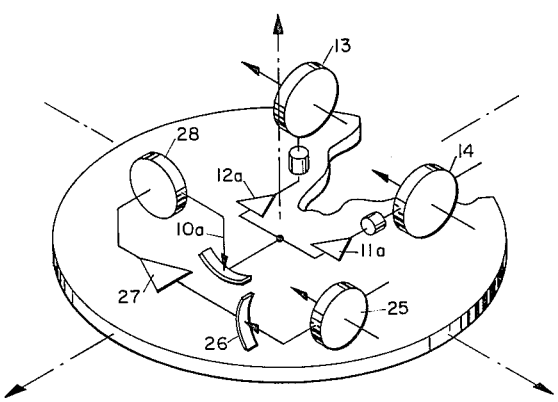
Figure 5:
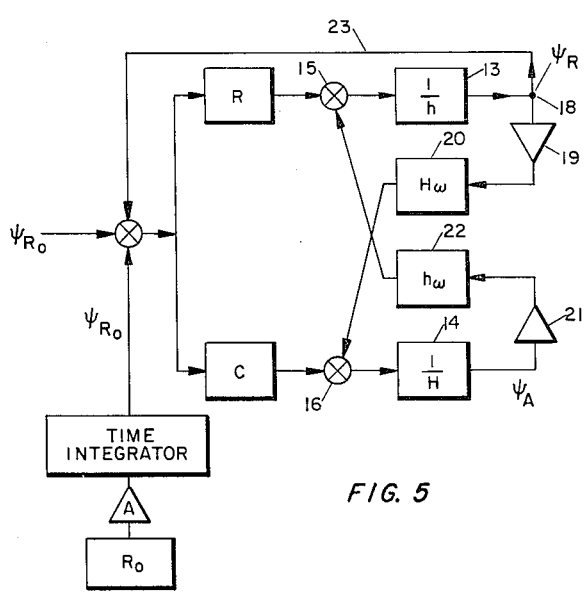

FIGURE 3 explains in block diagram, the mathematical treatment of the components illustrated in FIGURE 2;

FIGURE 4 shows in a partially perspective and partially schematic view similar to FIGURE 2, the improvement contemplated herein;

FIGURE 5 describes in block diagram similar to FIGURE 3, the mathematical treatment of the components illustrated in FIGURE 4;

FIGURE 6 shows an alternate way of looking at the inventive features contemplated herein; and, FIGURE 7 shows in partially perspective and partially schematic form some of the components shown schematically in FIGURES 4, 5, and 6.

Figure 1:
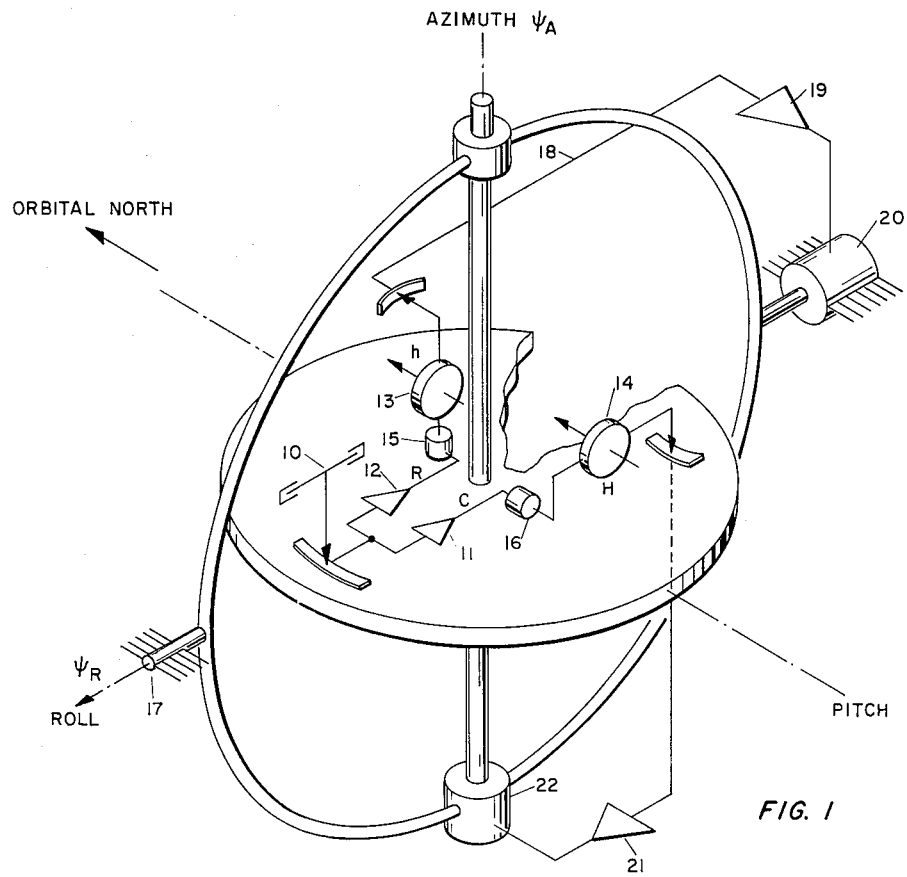
FIGURE 1 is a partially perspective and partially schematic view of a portion of a platform presently in use.

In order to better understand the present invention, an explanation of gyrocompassing procedure must first be given. Shown in FIGS. 1 and 2 of the drawings is a portion of a standard 3-gyro platform whose verticality is established by a horizon tracker of limited accuracy. For the purpose of simplification, only the roll and azimuth loops are taken into consideration. The portion of the platform relating to the pitch loop has been cut away. As long as all angles are kept small, the pitch loop need not be considered. In FIGS. 1 and 2 of the drawings, the roll component of the horizon tracker 10 is shown as an arrow directed towards the center of the earth. Its signal is amplified in amplifiers 11 and 12. A portion of the horizon tracker signal having a value of R torques the East-West gyro 13 while a portion having a value C torques the azimuth gyro 14. When the compassing is perfect, the spin axes of both gyros are parallel to the axis of the orbital rotation. The North-South gyro, which is not shown in the drawings, has its spin axis in the East-West direction. It sees full orbital speed and must be torqued accordingly.

Initially, as explained in FIG. 3, the platform is leveled to vertical using the horizon tracker and the horizon tracker is then nulled. Now, when the roll axis becomes displaced an angle $\psi_A$ from the orbit plane, a component of the orbital rotation causes the platform carrying the gyros to roll with respect to inertial space. This roll motion takes place about the input axis of the East-West gyro 13. Since this is a rate-integrating gyro, an output builds up, causing a pick-off signal to be developed. This signal 18 is amplified in an amplifier 19 and applied to the roll servo motor 20 in such a direction that the resulting motor rotation precesses the gyro to a null. This causes the gyro platform to roll with respect to the orbital plane. This roll is sensed by the horizon tracker 10 which develops an output signal 23. The portion of the horizon tracker having a value C is fed to the azimuth gyro torquer 16 causing the azimuth gyro 14 to develop a pickoff signal. The signal is amplified in an amplifier 21 and fed to the azimuth servo motor 22 in the proper phase to drive the platform in the null direction so as to cancel out the error $\psi_A$. The other portion of the tracker signal having a value R goes to the East-West gyro torquer 15 and forces this gyro to reduce its deflection, thus slowing down the motion and providing damping.

The action of the components described in block diagram in FIG. 3 may be expressed mathematically as follows, where $h$ is the angular momentum of the East-West gyro
$H$ is the angular momentum of the azimuth gyro
$\omega$ is the angular velocity of orbit of the space vehicle
$\psi_R R$ as hereinbefore stated is the value of that component of the horizon tracker signal torquing the East-West gyro
$\psi_R C$ as hereinbefore stated is the value of that component of the horizon tracker signal torquing the azimuth gyro
$\psi_R$ is the roll angle
$\psi_A$ is the azimuth angle
$R\psi_{Ro}$ and $C\psi_{Ro}$ designate the amount of inaccuracy of the horizon tracker Then, the torques around the roll axis are $$h\dot{\psi}_A = -R(\psi_R + \psi_{Ro}) - h\omega\psi_A \qquad (1)$$

The torques around the azimuth axis are $$-H\dot{\psi}_A = -C(\psi_R + \psi_{Ro}) - H\omega\psi_R \qquad (2)$$

A study of these expressions shows that the members on the left side are gyroscopic terms, the members with R and C are control terms and the members with ω are compassing torques. The foregoing simplification assumes that the servo loops are very stiff through high amplification, keeping the gyro spin axes parallel to the pitch axis. Otherwise, the torque equations of the gyro output axes have to be taken into consideration.

By resolving, $$\ddot{\psi}_R + \frac{R}{h}\dot{\psi}_R + \omega\frac{C+H\omega}{H}\psi_R = -\omega\frac{C}{H}\psi_{R0} \quad (3)$$

$$\ddot{\psi}_A + \frac{R}{h}\dot{\psi}_A + \omega\frac{C+H\omega}{H}\psi_A = -\omega\frac{R}{h}\psi_{R0} \quad (4)$$

The left side is a damped oscillation as long as $$R < 2h\sqrt{\omega\frac{C+H\omega}{H}} \quad (5)$$

The undamped natural frequency "$f$" may be expressed as $$f_{nat} = \frac{1}{2\pi}\sqrt{\omega\frac{C+H\omega}{H}} \quad (6)$$

and, the percentage of critical damping Z expressed by $$Z = \frac{R}{2h}\sqrt{\omega\frac{C+H\omega}{H}}^{-1} \quad (7)$$

On the right side of these equations appear the disturbing forces caused by the imperfection of the horizon tracker.

For a steady state condition, the errors in roll and azimuth may be expressed as Roll: $\psi_R = -\frac{C}{C+H\omega}\cdot\psi_{R0}$ (8)

Azimuth: $\psi_A = -\frac{H}{h}\cdot\frac{R}{C+H\omega}\cdot\psi_{R0}$ (9)

Since the value of C is so chosen that it is much larger than H this factor may be neglected and the natural frequency may be written as $$f_{nat} \approx \frac{1}{2\pi}\sqrt{\omega\frac{C}{H}} \quad (10)$$

It is evident therefore that the natural undamped frequency of the compassing loop increases with the square root of increasing orbital speed ω, with increasing signal strength C and decreasing angular momentum H of the azimuth gyro. Although the angular momentum $h$ of the East-West gyro and the signal value R are not involved, these two quantities determine the damping value of the loop. With increasing R and decreasing $h$, the damping increases. Under steady state conditions, a small H keeps the azimuth error $\psi_A$ small as shown in Equation 9 and the frequency up as shown in Equation 10. A small value of $h$ is favorable for good damping as shown in Equations 3, 4, and 5, but adversely affects the azimuth error $\psi_A$ shown in Equation 9. Since other factors such as stability considerations of the platform loops, sealing of the gyros from the design point of view, etc., are involved, the values of H and $h$ will be determined by these other factors rather than with the objective in view of improving the vertical reference. Regarding C, its value should be large in order to obtain a high natural frequency "$f$" as shown in Equation 10 and a small azimuth error $\psi_A$ shown in Equation 9. In the roll error Equation 8, C appears in the numerator as well as in the denominator. Since it is normally large, compared with Hω it has hardly any influence on the roll angle error $\psi_R$. The upper limit of C is dictated by the heat capacity of gyro torquer and, or by the noise spectrum of the tracker that might not allow any further increase above a certain frequency in order to avoid resonance. The influence of the value R can be recognized by studying Equations 7 and 9. A large R value increases damping Z, but also increases the azimuth error $\psi_A$. If a short settling time is desired, a large R value should be selected, bearing in mind that there will be a greater azimuth error or vice versa. The steady state errors, $\psi_R$ of Equation 8 and of $\psi_A$ of Equation 9 show that a horizon tracker error in roll $\psi_{R0}$ causes a platform roll error $\psi_R$, and if $h \approx H$, then the same tracker error also produces an azimuth error, reduced by the error $R/C$.

To eliminate this platform error in roll and azimuth, a second azimuth gyro 25, shown in FIGURE 4 and described in a block diagram explanation in FIGURE 5 is provided. Second azimuth gyro 25 is also a rate-integrating gyro. This gyro is not torqued and free around its output axis. In its steady state, its spin axis aligns itself parallel to the axis of rotation of the orbital motion and provides a perfect roll reference. The signal from second azimuth gyro 25 is sensed by integrating means 26, and integrated with respect to time. The output of integrating means 26 is amplified in an amplifier 27 and fed to a horizon tracker error correction means e.g., torquer 28 which will bias out the error in the horizon tracker 10a nd provides the proper values of R and C to East-West gyro torquer 12a and azimuth torquer 11a. This arrangement is shown in greater detail in FIGURE 7. The output from second azimuth gyro 25 is amplified in an amplifier 35 and operates a D.C. motor 36 which turns a worm gear 37 and pinion 38. Pinion 38 in turn rotates the wiper arm of potentiometer 39 which is in a circuit controlling horizon tracker torquer 28. The combination of the D.-C. motor, worm gear, pinion and potentiometer integrates the output from the second azimuth gyro with respect to time to provide the proper signal to horizon tracker torquer 28 to bias out the tracker error. Although the arrangement depicted in FIGURES 4 and 5 provide a more understandable explanation, in practice, the arrangement of FIGURE 6 may also be used. Here, the output of second azimuth gyro 40 is shown as being fed to an integrating means 41, the output of which is amplified in amplifier 42 and instead of being fed to a torquer, the horizon tracker error correction means is a junction point 43 which receives the output of horizon tracker 10, and the output of amplifier 42.

It is to be observed therefore that the present invention provides for an improvement in platform vertical reference information in that to a platform having an East-West gyro and an azimuth gyro receiving vertical information from a horizon tracker, there is incorporated on the platform a second rate integrating azimuth gyro having pick-off means sensing any platform roll. The output of this second azimuth gyro pick-off means is used to bias out the horizon tracker error. The rate integration feature of the second azimuth gyro may be performed by the combination of a D.-C. motor responsive to the second azimuth gyro output which motor turns a worm gear acting on a pinion. The pinion in turn rotates a potentiometer in the horizon tracker torquer circuit. In this way, the roll error signal of the second azimuth gyro integrated with respect to time is used to bias out the tracker error.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. In a platform arrangement used for gyrocompassing aboard a space satellite orbiting the earth, said platform arrangement including azimuth and East-West gyros and a horizon tracker for supplying course vertical reference information, a portion of which is utilized to torque the azimuth and East-West gyros, the improvement therein, to improve the vertical reference information supplied, comprising, in combination, a freely rotating second azimuth gyro, second azimuth gyro pick-off means sensing any platform roll, and horizon tracker error correction means coupled to said horizon tracker, the output of said pick-off means being fed to said correction means to bias out any error in the horizon tracker information.

2. A device as claimed in claim 1, said second azimuth gyro pick-off means having time rate integrating means coupled thereto, any platform roll sensed by said second azimuth gyro being integrated with respect to time to establish the signal fed to said horizon tracker error correction means.

3. A device as claimed in claim 2, said rate intergrating means including a motor actuated by the sensed roll signal of the pick-off means, a worm gear turned by said motor, a pinion turned by said worm gear, a potentiometer wiper arm turned by said pinion, the horizon tracker error correction means being responsive to the magnitude of the electrical output from the wiper arm of the potentiometer.

No references cited.

BROUGHTON G. DURHAM, *Primary Examiner.*

K. DODD, P. W. SULLIVAN, *Assistant Examiners.*